(12) United States Patent
Zacheis (10) Patent No.: US 12,434,118 B1
(45) Date of Patent: *Oct. 7, 2025

(54) GOLF BAG

(71) Applicant: Ogio International, Inc., Carlsbad, CA (US)

(72) Inventor: Craig Zacheis, Vista, CA (US)

(73) Assignee: Ogio International, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,876

(22) Filed: Mar. 5, 2025

Related U.S. Application Data (63) Continuation of application No. 18/530,036, filed on Dec. 5, 2023, now Pat. No. 12,330,029, which is a continuation-in-part of application No. 29/825,407, filed on Feb. 1, 2022, now Pat. No. Des. 1,057,411.

(51) Int. Cl.
*A63B 55/40* (2015.01)
*A63B 55/00* (2015.01)

(52) U.S. Cl.
CPC ............ *A63B 55/40* (2015.10); *A63B 55/406* (2015.10); *A63B 55/408* (2015.10); *A63B 2225/68* (2013.01)

(58) Field of Classification Search
CPC ... A63B 2209/10; A63B 55/408; A63B 55/40; A63B 55/00
USPC ...... 220/694; 206/315.1–315.3, 315.6, 315.8
See application file for complete search history.

(56) References Cited

U.S. PATENT DOCUMENTS

| | | |
|---|---|---|
| 5,267,660 A | 12/1993 | Kwon |
| 5,755,322 A | 5/1998 | Yang |
| 5,772,024 A | 6/1998 | Lueders |
| 5,799,785 A | 9/1998 | Hsu |
| 6,109,433 A | 8/2000 | Pratt |
| D442,783 S | 5/2001 | Pratt |
| D495,492 S | 9/2004 | Chang |
| 6,877,604 B2 | 4/2005 | Pratt |
| 7,213,705 B2 | 5/2007 | Pratt |
| D649,356 S | 11/2011 | Loudenslager |
| D848,734 S | 5/2019 | Maki |
| D858,104 S | 9/2019 | Maki |
| D871,760 S | 1/2020 | Smith |
| D872,464 S | 1/2020 | Smith |
| D872,465 S | 1/2020 | Smith |

(Continued)

FOREIGN PATENT DOCUMENTS

| | | |
|---|---|---|
| CN | 304728615 | 7/2018 |
| CN | 305369119 | 10/2019 |

(Continued)

OTHER PUBLICATIONS

OGIO Sllencer Cart Bag, first available Jan. 21, 2023, amazon.com (online) (site visted Jan. 22, 2024), Available at URL; https://www.amazon.com/OGIO-2023-Sliencer-Cart-Bag/dp/BOBLP84BRZ?th=1 (Year: 2023).

*Primary Examiner* — Anthony D Stashick
*Assistant Examiner* — Raven Collins
(74) *Attorney, Agent, or Firm* — Michael A. Catania (57) ABSTRACT

A golf bag having a base assembly, a shaft immobilization component, a top assembly, an internal assembly, and an outer assembly is disclosed herein. The combination of the shaft immobilization component, the top assembly and the internal assembly restrict the movement of golf clubs and prevents the interaction of golf clubs within the golf bag.

4 Claims, 14 Drawing Sheets

(56) References Cited

U.S. PATENT DOCUMENTS

| | | |
|---|---|---|
| D872,466 S | 1/2020 | Smith |
| D872,467 S | 1/2020 | Smith |
| D872,995 S | 1/2020 | Smith |
| D945,163 S | 3/2022 | Doberstein |
| D949,568 S | 4/2022 | Doberstein |
| 2002/0115495 A1 | 8/2002 | Tan |
| 2008/0011631 A1 | 1/2008 | Kim |

FOREIGN PATENT DOCUMENTS

| | | |
|---|---|---|
| CN | 306607133 | 6/2021 |
| CN | 307589470 | 10/2022 |

GOLF BAG

CROSS REFERENCES TO RELATED APPLICATIONS

The Present Application is a continuation application of U.S. patent application Ser. No. 18/530,036, filed Dec. 5, 2023, now U.S. Pat. No. 12,330,029, issued on Jun. 17, 2025, which is a continuation-in-part application of U.S. patent application Ser. No. 29/825,407, filed on Feb. 1, 2022, now U.S. Pat. No. D1057411, issued on Jan. 14, 2025, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to golf bags.

Description of the Related Art

Golf bags of all kinds, including stand and cart bags, typically are assembled from a base, a top with multiple openings, and a body with structural support that connects the base and the top. The prior art includes certain golf bag dual strap mechanisms such as that disclosed in U.S. Pat. No. 5,419,473 to Lamar. These prior art mechanisms are not ideal, however, because the dual strap feature lacks sufficient insulation of the user from the golf bag to reduce any discomfort to the user. In order to address this concern, prior art systems often incorporate waistband systems, which increases the difficulty of assembling the bag as well as its overall weight. Therefore, there is a need for an improved assembly mechanism for golf bags with dual shoulder strap mechanisms in particular.

BRIEF SUMMARY OF THE INVENTION

One aspect of the present invention is a golf bag comprising a base assembly, a shaft immobilization component, a top assembly, an internal assembly, and an outer assembly. The shaft immobilization component comprises a first outer side wall, a second outer side wall, a front wall, a rear wall, and extension members. Each extension member extends from the first outer side wall to the second outer side wall. Each extension member has teeth. Each extension member also has an upper panel with a hook and loop fabric attached thereto. The shaft immobilization component is positioned within the base assembly. The top assembly comprises individual golf club separation members. The internal assembly comprises individual chambers extending from the top assembly to each upper panel of the shaft immobilization component. The outer assembly is attached to the top assembly and the base assembly. The internal assembly is positioned within the outer assembly. The combination of the shaft immobilization component, the top assembly and the internal assembly restrict the movement of golf clubs and prevents the interaction of golf clubs within the golf bag.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in the figures, a golf bag 10 comprises a base assembly 20, a shaft immobilization component 30, a top assembly 40, an internal assembly 50, and an outer assembly 60.

The golf bag 10 has a height preferably ranging from 30 to 40 inches, and most preferably 34 inches. The golf bag 10 has a mass preferably ranging from 4 to 10 pounds, and is most preferably approximately 7 pounds.

Figure 9:
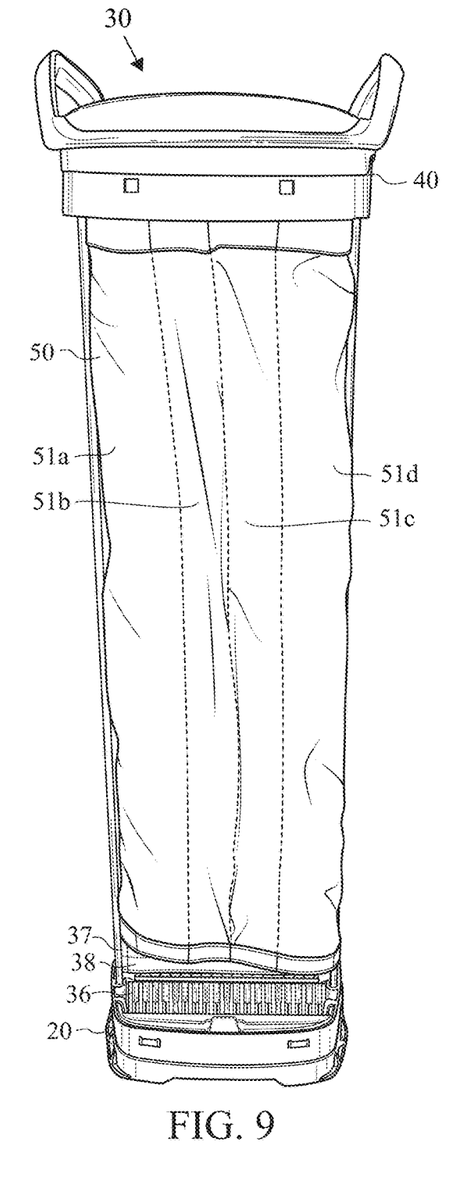
FIG. 9 is an isolated front view of the top assembly, the internal assembly, the shaft immobilization component, and the base.
Figure 10:
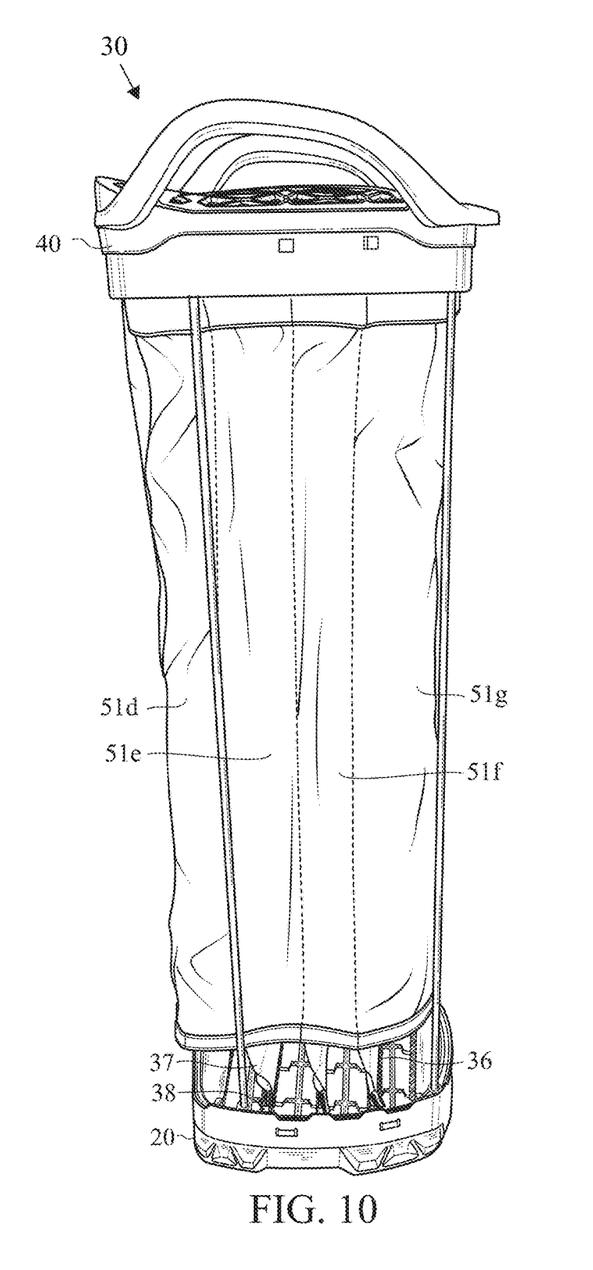
FIG. 10 is an isolated side view of the top assembly, the internal assembly, the shaft immobilization component, and the base assembly.
Figure 11:
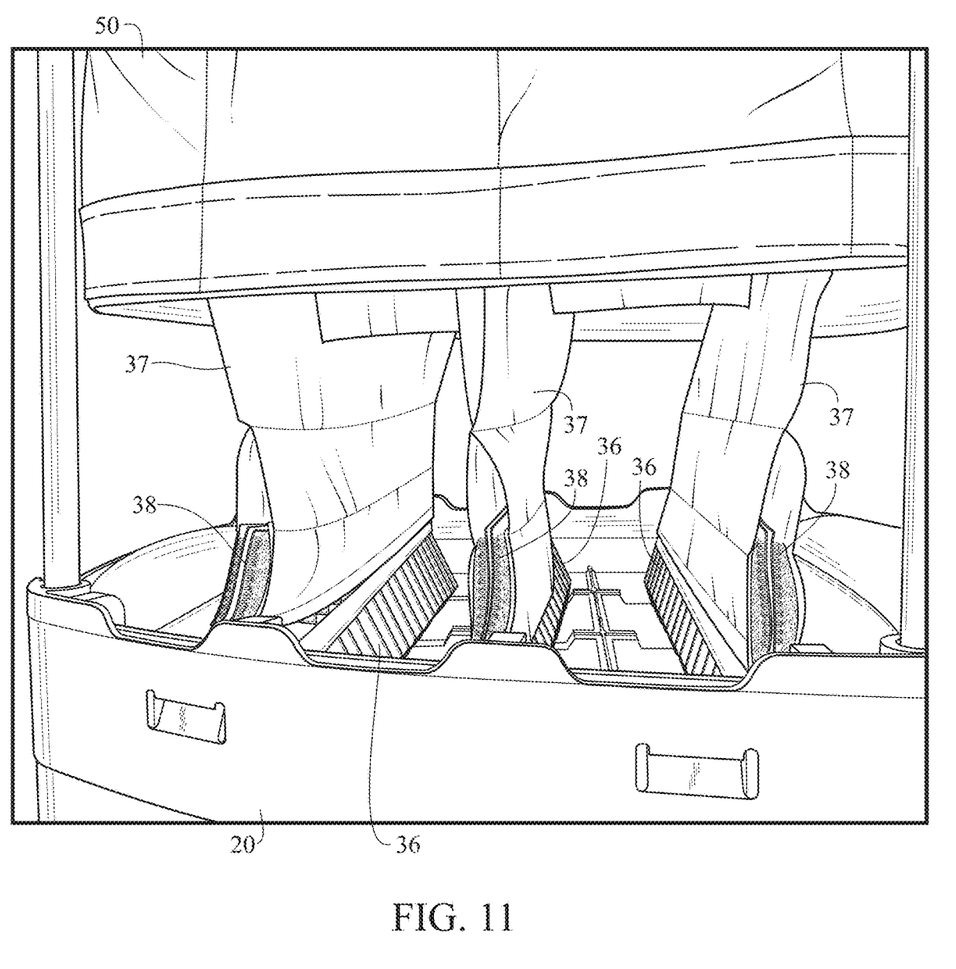
FIG. 11 is an enlarged view of the connection of the internal assembly to the shaft immobilization component.
Figure 12:
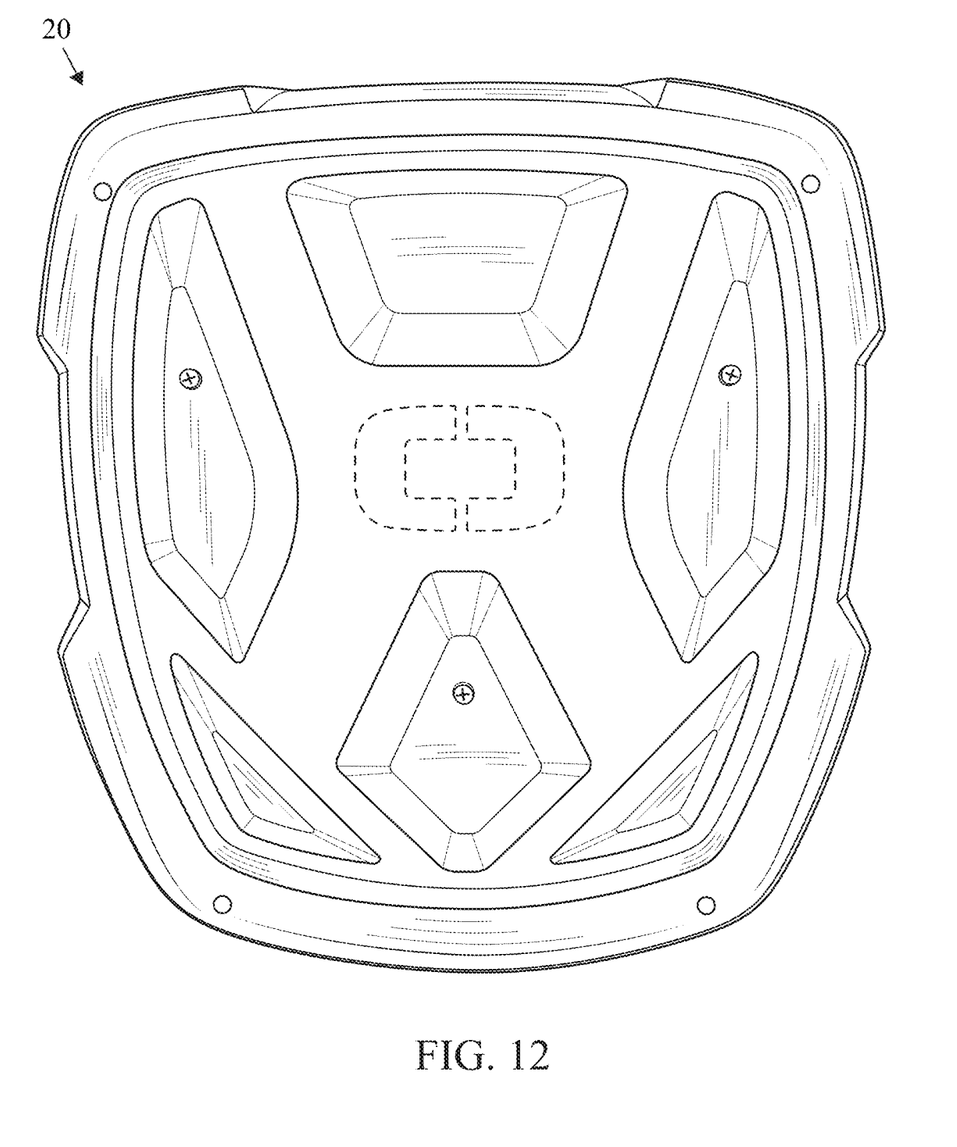
FIG. 12 is a bottom plan view of the base assembly of a golf bag.
Figure 13:
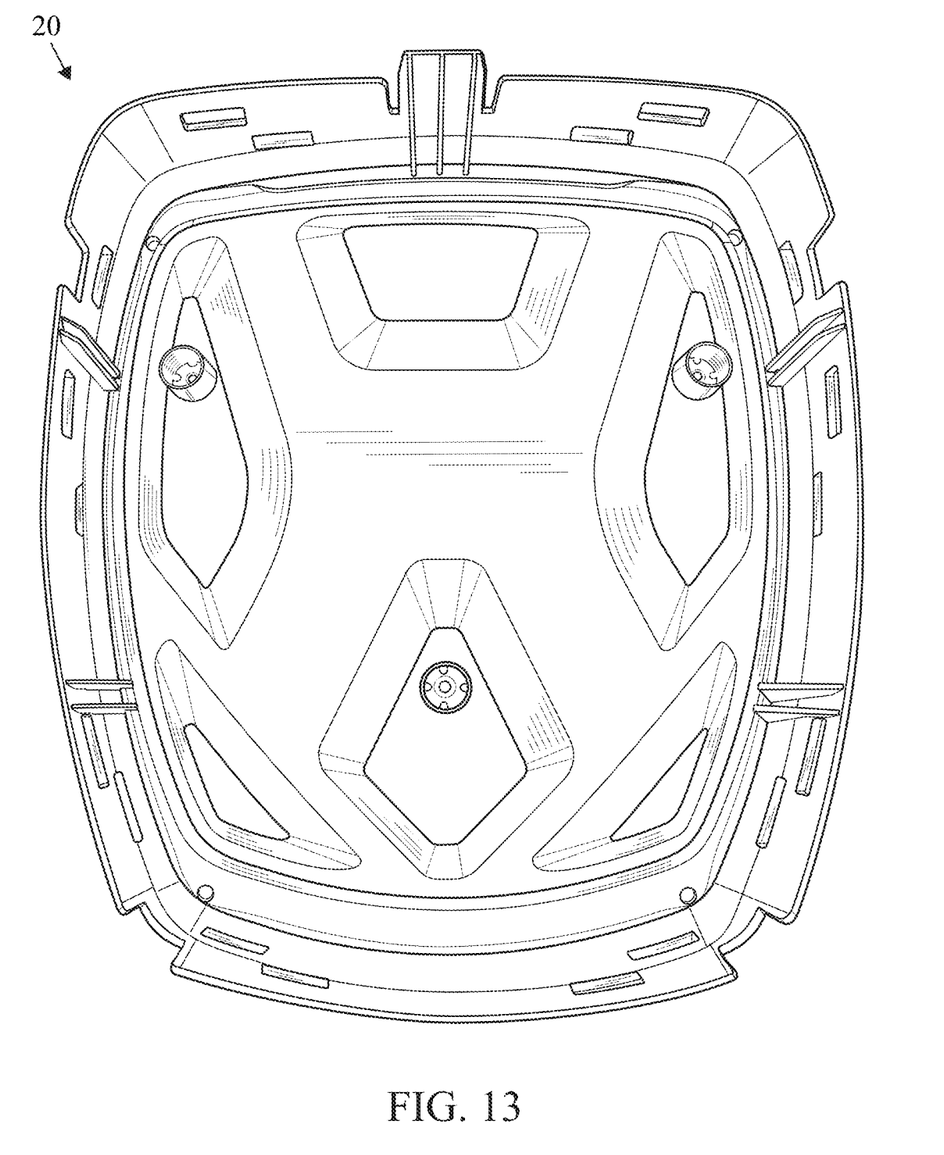
FIG. 13 is a top plan view of the base assembly of a golf bag.
Figure 14:
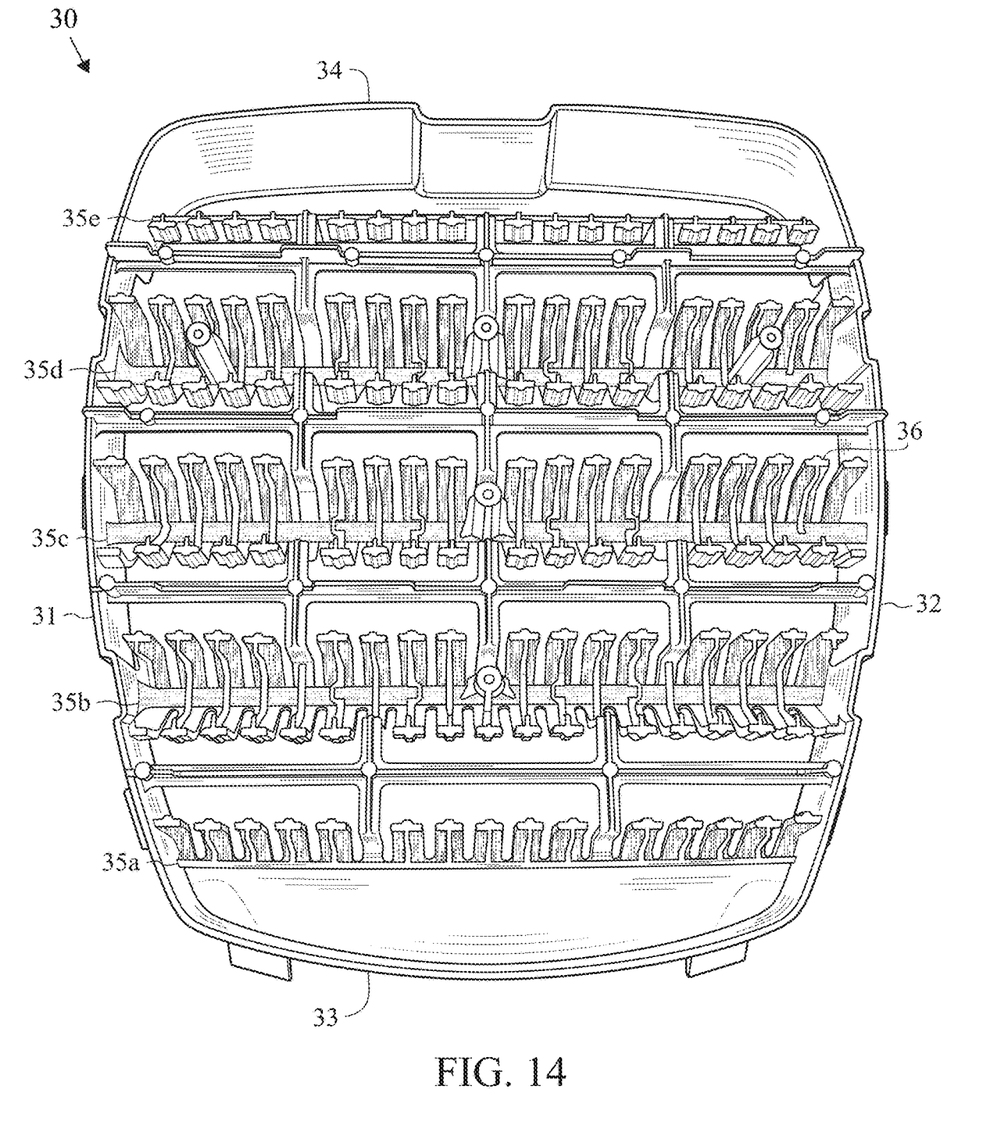
FIG. 14 is a top plan view of the shaft immobilization component of a golf bag.
Figure 15:
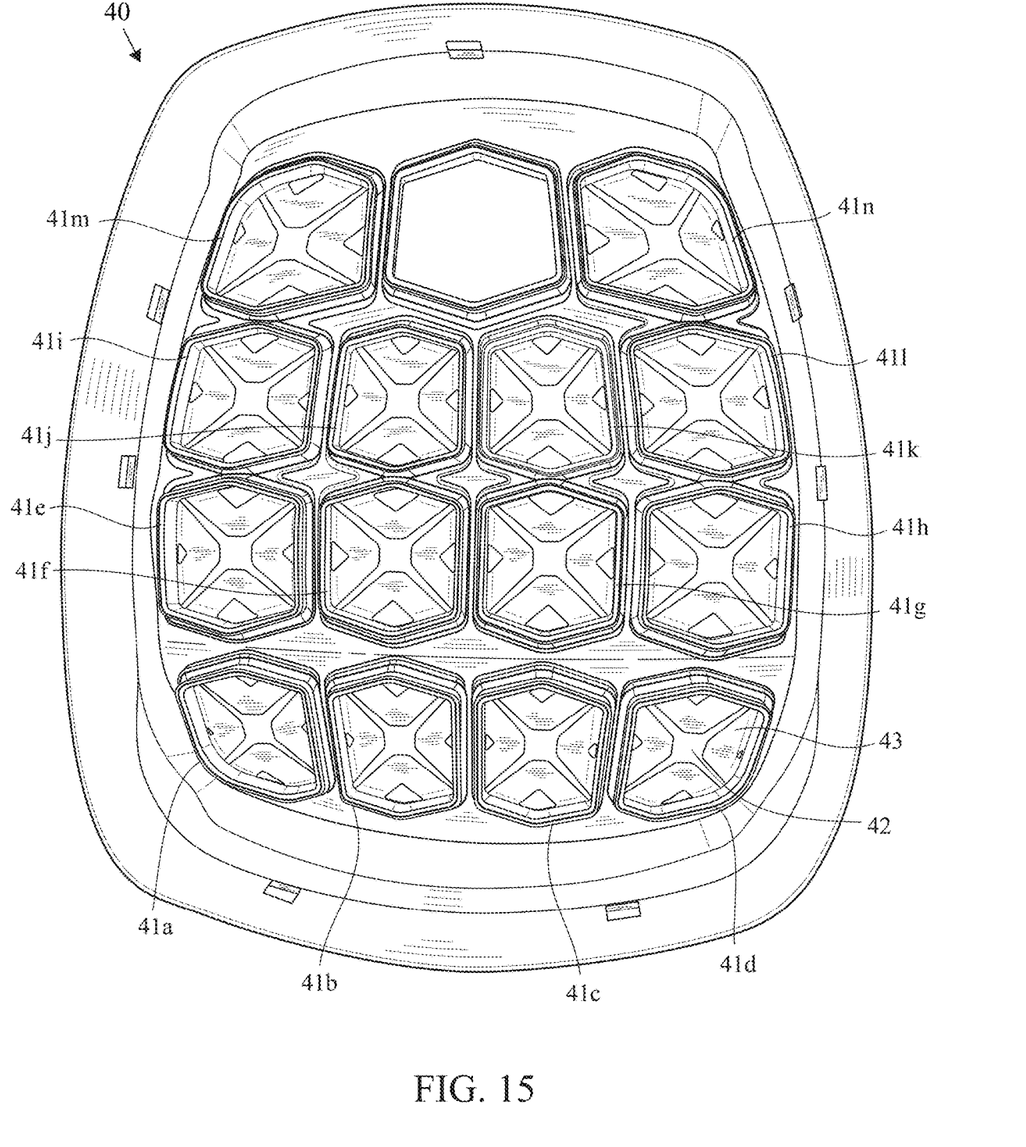
FIG. 15 is an isolated top plan view of a top assembly for a golf bag.

The shaft immobilization component 30, shown in FIG. 14, comprises a first outer side wall 31, a second outer side wall 32, a front wall 33, a rear wall 34, and extension members 35. Each extension member 35 extends from the first outer side wall 31 to the second outer side wall 32. Each extension member 35 (extension members 35*a-e* are shown in FIG. 14) has teeth 36 for restricting the movement of a butt end of a golf club. Each extension member 35 also has an upper panel 37 with a hook and loop fabric member 38 (preferably VELCRO® fabric) attached thereto, as shown in FIGS. 9-11. The shaft immobilization component 30 is positioned within the base assembly 20. The base assembly 20 is shown in FIGS. 12-13.

The top assembly 40, shown in FIGS. 1-8 and FIG. 15, comprises individual golf club separation members 41

Figure 1:
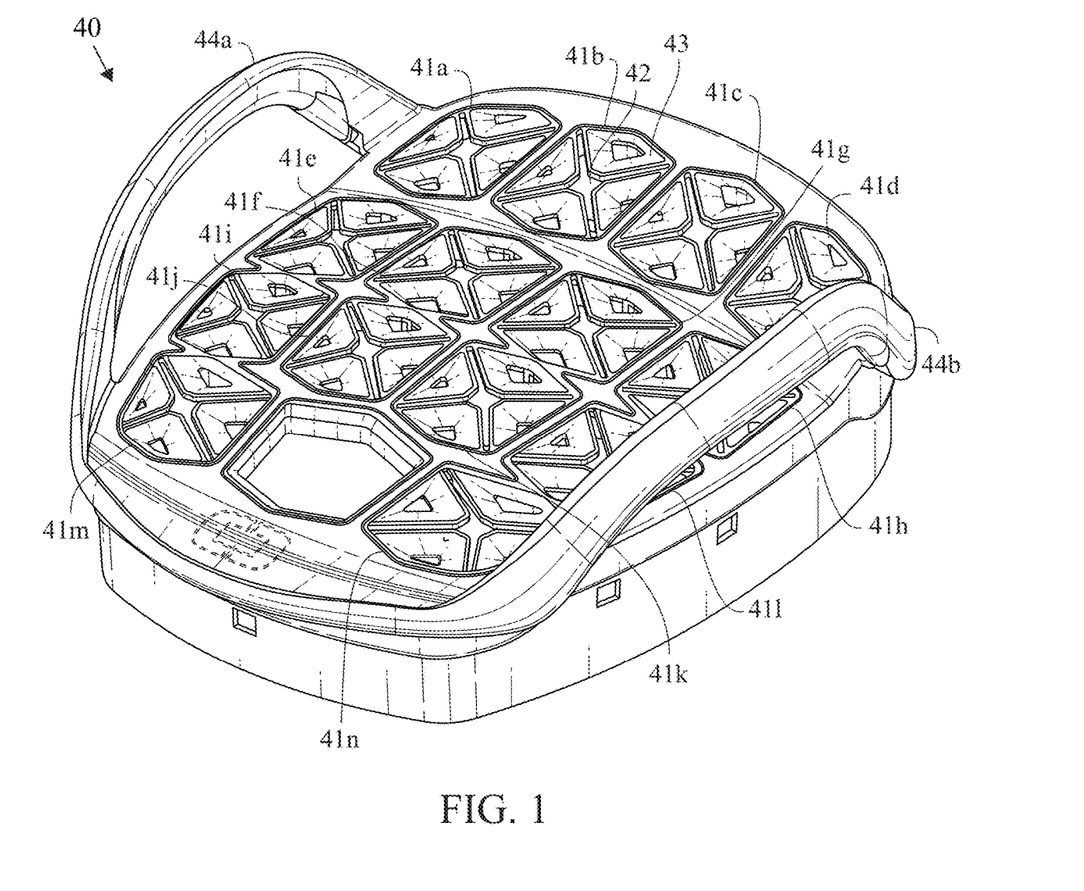
FIG. 1 is an isolated top perspective view of a top assembly for a golf bag.
Figure 2:
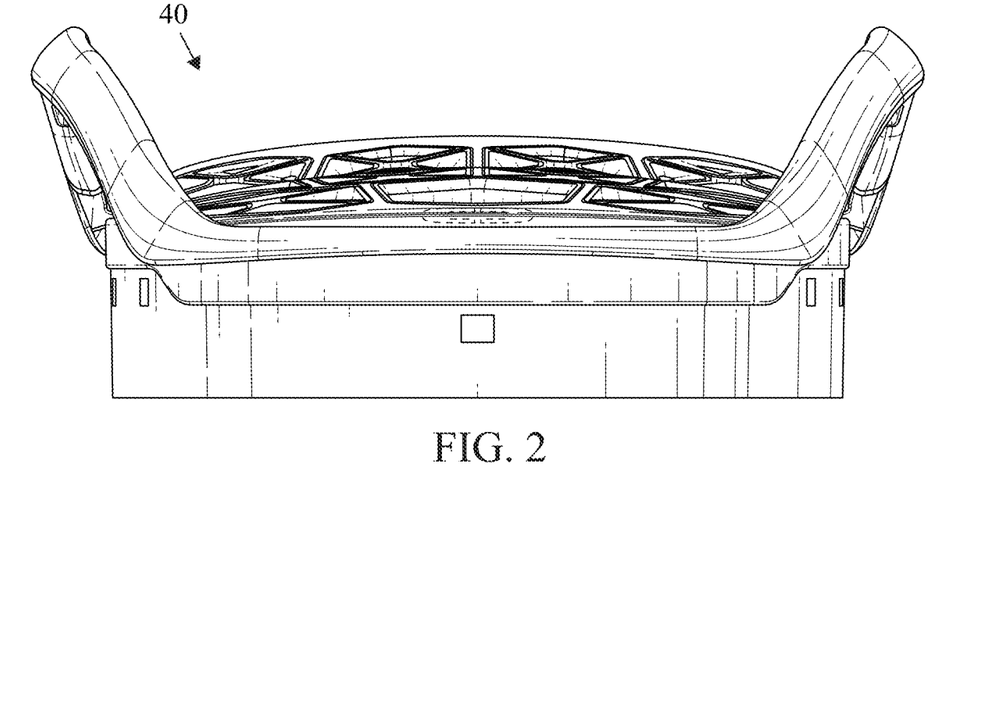
FIG. 2 is an isolated front elevation view of a top assembly for a golf bag.
Figure 3:
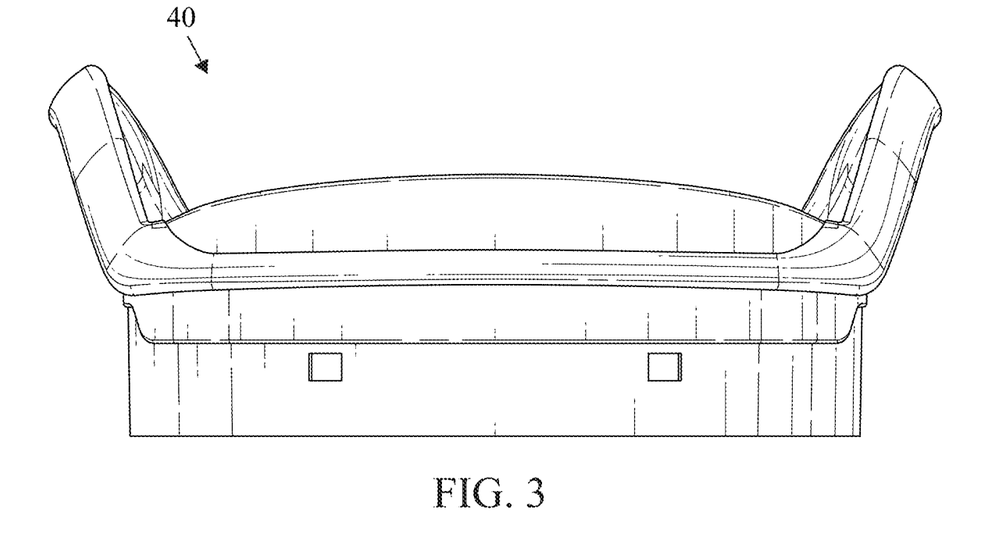
FIG. 3 is an isolated rear elevation view of a top assembly for a golf bag.
Figure 4:
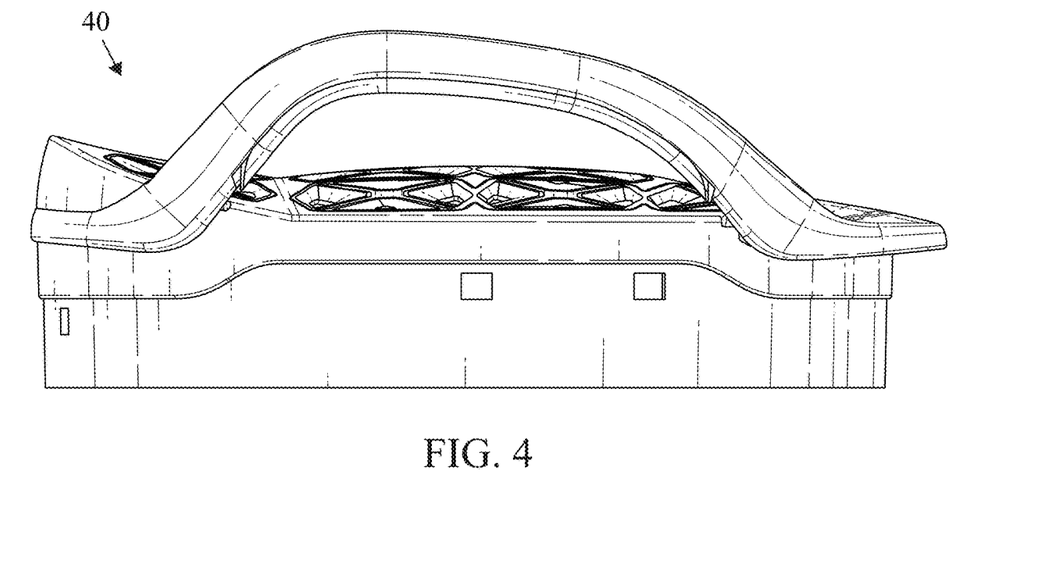
FIG. 4 is an isolated side elevation view of a top assembly for a golf bag.
Figure 5:
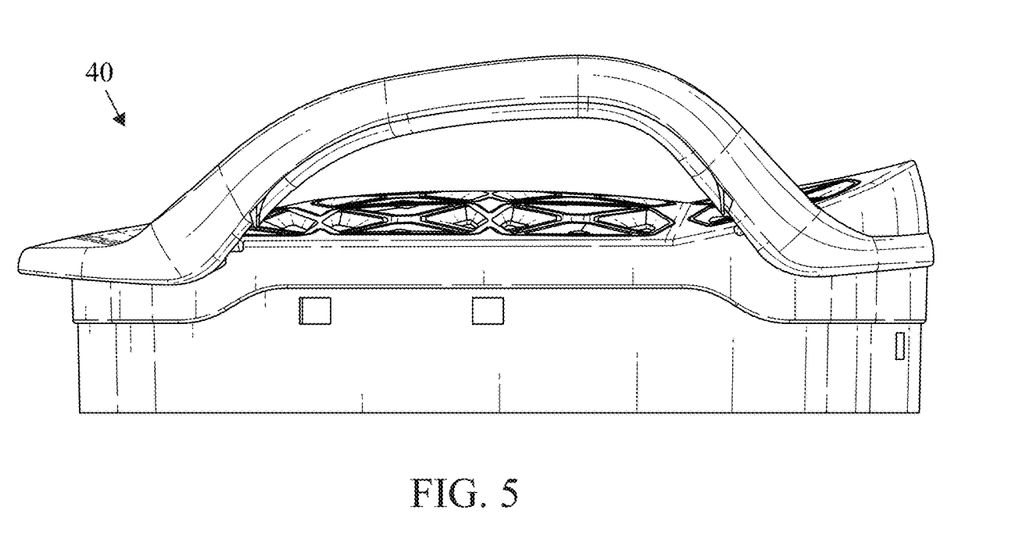
FIG. 5 is an isolated side elevation view of a top assembly for a golf bag.
Figure 6:
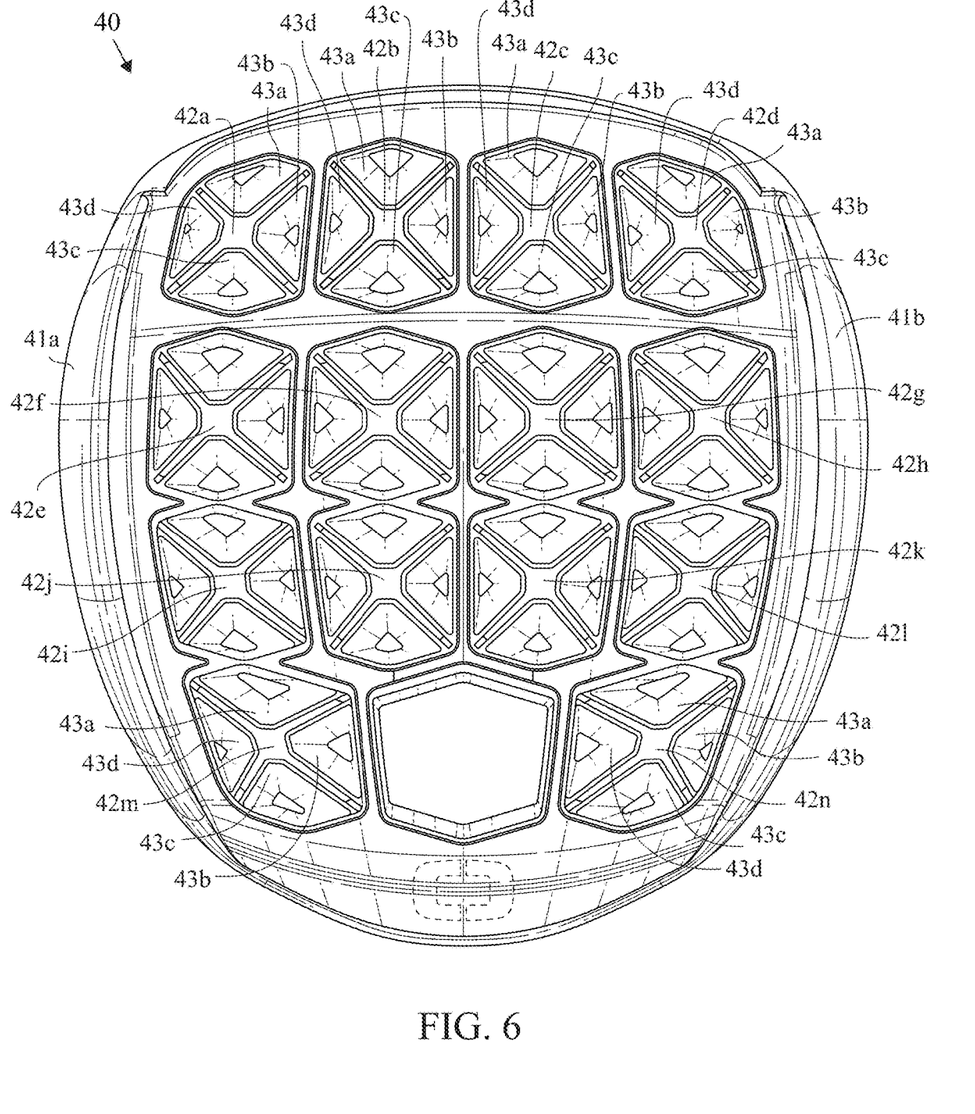
FIG. 6 is an isolated top plan view of a top assembly for a golf bag.
Figure 7:
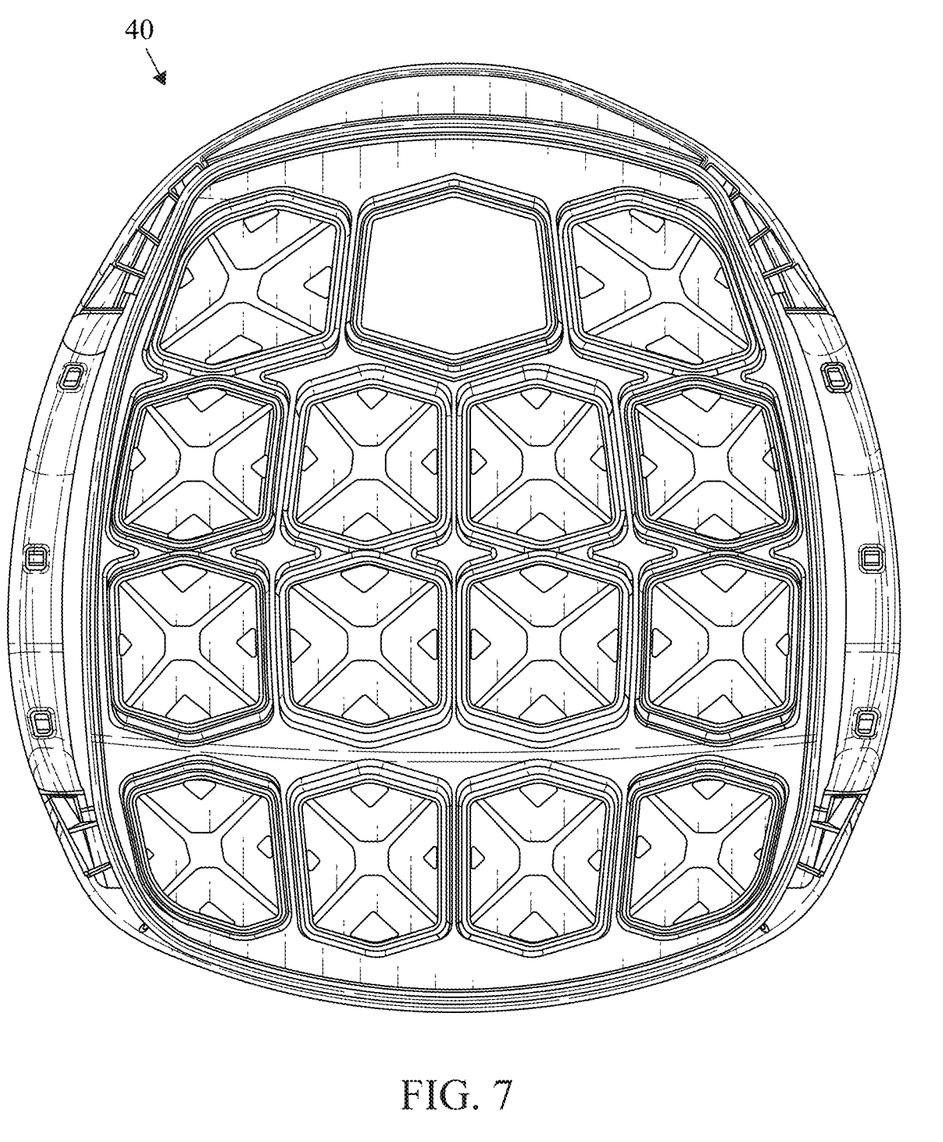
FIG. 7 is an isolated bottom plan view of a top assembly for a golf bag.
Figure 8:
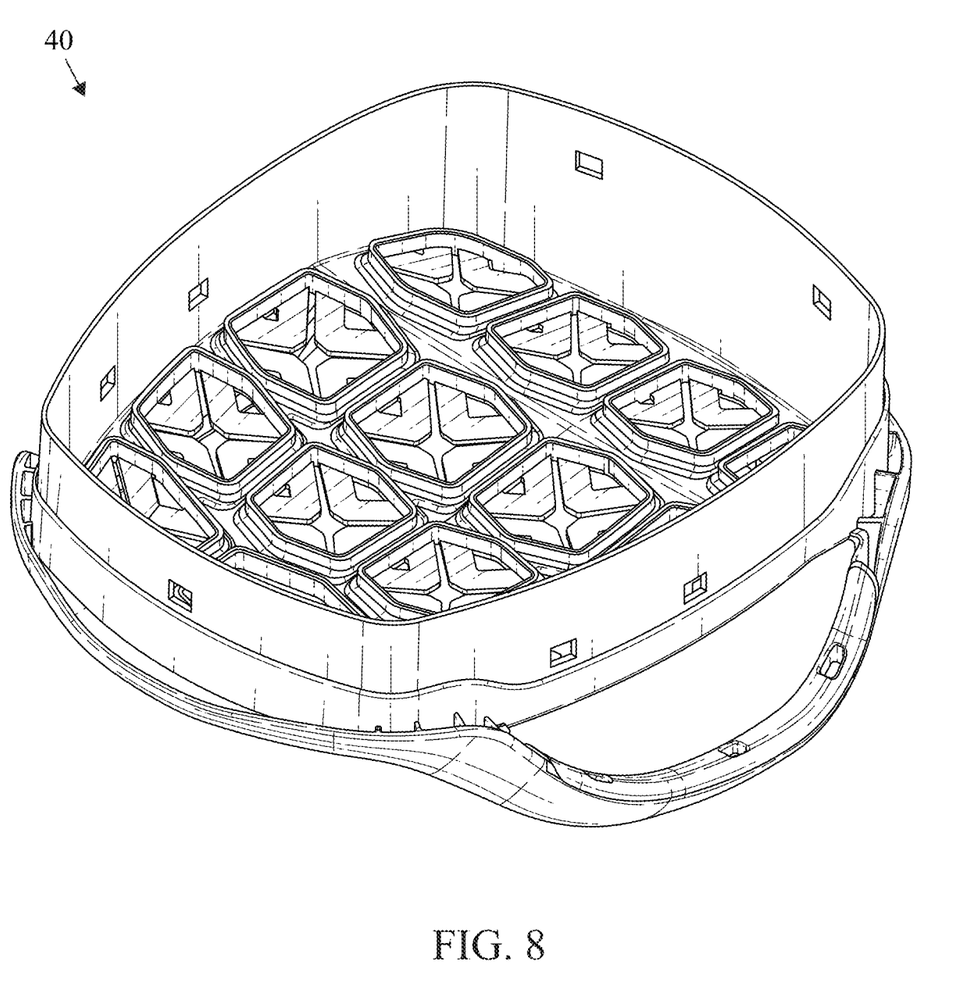
FIG. 8 is an isolated bottom perspective view of a top assembly for a golf bag.

(separation members 41a-n are shown in FIG. 1). The individual golf club separation members 41 range from preferably 12-16, and are most preferably 14. Each of the individual golf club separation members 41 comprises slots 42 (slots 42a-n are shown in FIG. 6) defined by movable walls 43 (movable walls 43a-d are shown in FIG. 6 for each of the separation members 41a-n). The top assembly further comprises handles 44a and 44b.

The internal assembly 50, shown in FIGS. 9-11, comprises individual chambers 51 (chambers 51a-g are shown in FIGS. 9 and 10) extending from the top assembly 40 to each corresponding upper panel 37 of the shaft immobilization component 30, as shown in FIG. 11.

Figure 16:
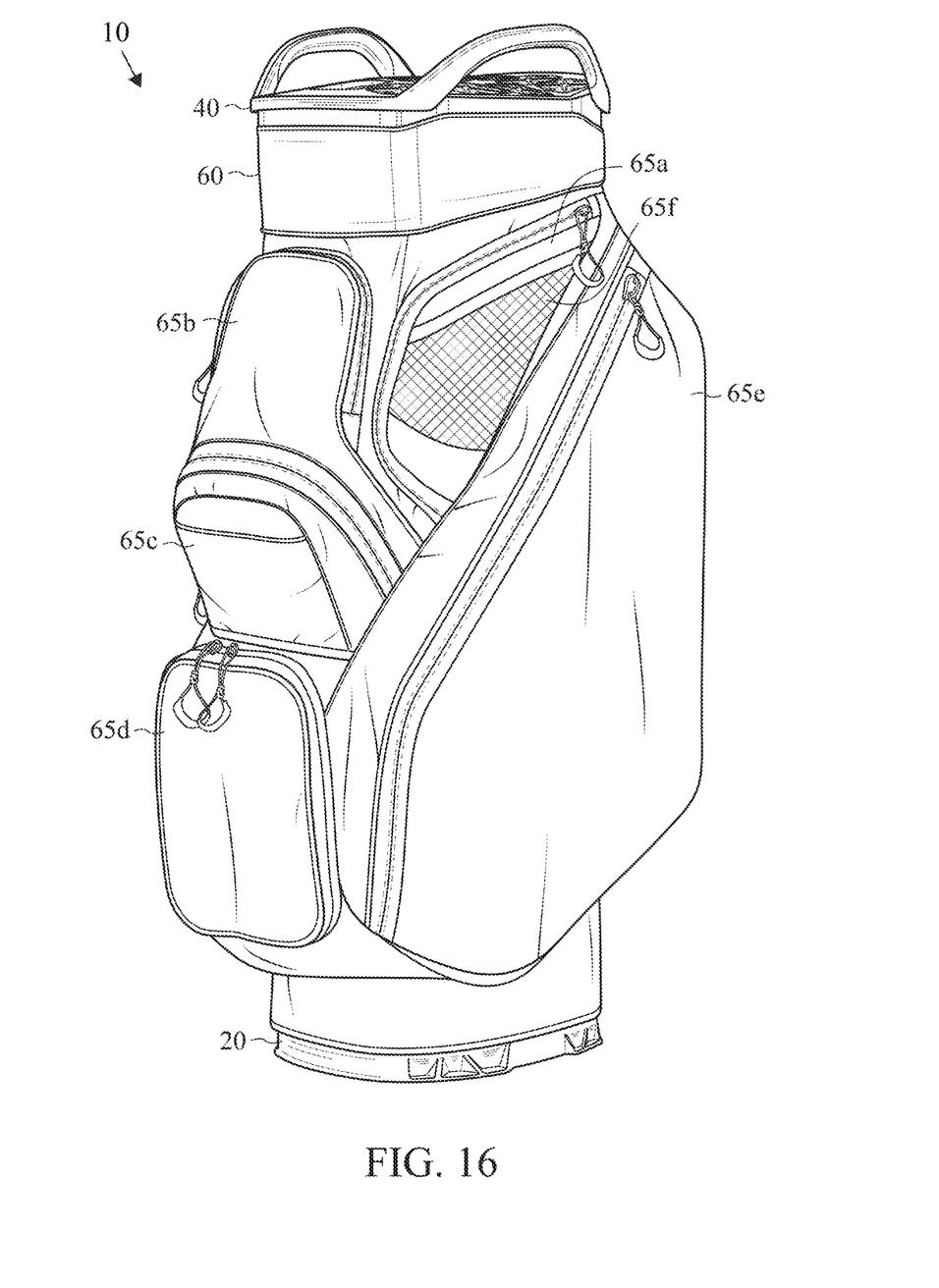
FIG. 16 is a top perspective view of a golf bag.
Figure 17:
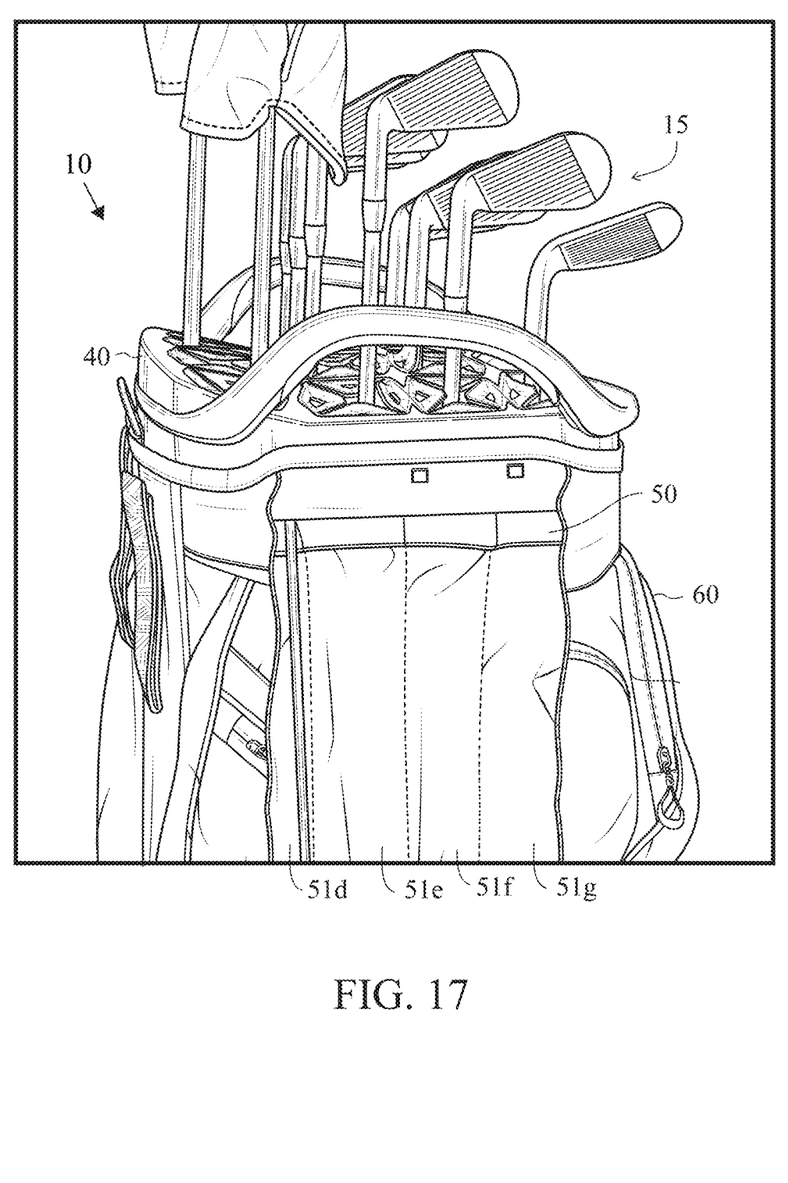
FIG. 17 is a partial sectional view of a golf bag.

The outer assembly 60, shown in FIGS. 16 and 17, is attached to the top assembly 40 and the base assembly 20. The outer assembly 60 is the outer shell of the golf bag 10. The internal assembly 50, attached to the top assembly 40 and the shaft immobilization component 30 that is attached to the base assembly 20, are positioned within the outer assembly 60. The internal assembly 50 is attached to the upper panels 37 of the shaft immobilization component 30, as shown in FIG. 11. The outer assembly 60 preferably comprises pockets 65 (pockets 65a-f are shown in FIG. 16), preferably 8 to 14, and most preferably 11.

The combination of the shaft immobilization component 30, the top assembly 40 and the internal assembly 50 restrict the movement of golf clubs 15, and prevents the interaction of golf clubs 15 placed within the golf bag 10.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A golf bag comprising:
a base assembly;
a shaft immobilization component comprising a first outer side wall, a second outer side wall, a front wall, a rear wall, a plurality of extension members, each of the extension members extending from the first outer side wall to the second outer side wall, each of the plurality of extension members having a plurality of teeth, each of the plurality of extension members also having an upper panel with a hook and loop fabric attached thereto, wherein the shaft immobilization component is positioned within the base;
a top assembly comprising a plurality of individual golf club separation members, wherein the plurality of individual golf club separation members ranges from 12-16;
an internal assembly comprising a plurality of individual chambers extending from the top assembly to the each upper panel of the shaft immobilization component;
an outer assembly attached to the top assembly and the base assembly, wherein the internal assembly is positioned within the outer assembly;
wherein the combination of the shaft immobilization component, the top assembly and the internal assembly restrict the movement of golf clubs and prevents the interaction of golf clubs within the golf bag;
wherein the golf bag has a height ranging from 30 to 40 inches;
wherein the golf bag has a mass ranging from 4 to 10 pounds.

2. The golf bag according to claim 1 wherein the outer assembly comprises a plurality of pockets.

3. The golf bag according to claim 1 wherein each of the plurality of individual golf club separation members comprises a plurality of slots defined by a plurality of movable walls.

4. The golf bag according to claim 1 wherein the top assembly further comprises a plurality of handles.

* * * * *